(12) United States Patent
Reiss et al.

(10) Patent No.: US 9,940,288 B1
(45) Date of Patent: Apr. 10, 2018

(54) SERDES ALIGNMENT PROCESS

(71) Applicant: Cadence Design Systems, Inc., San Jose, CA (US)

(72) Inventors: Loren Blair Reiss, Raleigh, NC (US); Fred Staples Stivers, Raleigh, NC (US); Scott Gerald Bare, Creedmoor, NC (US)

(73) Assignee: Cadence Design Systems, Inc., San Jose, CA (US)

( * ) Notice: Subject to any disclaimer, the term of this patent is extended or adjusted under 35 U.S.C. 154(b) by 193 days.

(21) Appl. No.: 14/948,761

(22) Filed: Nov. 23, 2015

(51) Int. Cl.
| G06F 13/40 | (2006.01) |
| H04L 7/04 | (2006.01) |
| G06F 13/20 | (2006.01) |
| H04L 7/033 | (2006.01) |

(52) U.S. Cl.
CPC ......... *G06F 13/4068* (2013.01); *G06F 13/20* (2013.01); *H04L 7/033* (2013.01); *H04L 7/04* (2013.01)

(58) Field of Classification Search
CPC ..... G06F 13/20; G06F 13/4068; H04L 7/033; H04L 7/04
See application file for complete search history.

(56) References Cited

U.S. PATENT DOCUMENTS

| 9,071,256 B1* | 6/2015 | Reiss | H03M 9/00 |
| 2002/0138675 A1* | 9/2002 | Mann | G06F 5/06 |
| | | | 710/61 |
| 2003/0112798 A1* | 6/2003 | Ziegler | H04L 25/14 |
| | | | 370/366 |
| 2008/0316320 A1* | 12/2008 | Prusia | H04L 25/03343 |
| | | | 348/207.99 |
| 2013/0101058 A1* | 4/2013 | Hummel | H04J 3/047 |
| | | | 375/259 |
| 2016/0080008 A1* | 3/2016 | Novellini | G06F 1/10 |
| | | | 375/296 |

* cited by examiner

*Primary Examiner* — Glenn A Auve
(74) *Attorney, Agent, or Firm* — Mark H. Whittenberger, Esq.; Holland & Knight LLP

(57) ABSTRACT

The present disclosure relates to a method for use with a serializer/deserializer comprising. The method may include operatively connecting one or more lane modules of an integrated circuit (IC) to form one or more links. The method may further include associating a FIFO reset generator with each of the one or more lane modules and receiving a signal from the FIFO reset generator at a synchronization FIFO. The method may also include aligning, at the synchronization FIFO, one or more enqueue pointers and dequeue pointers.

18 Claims, 15 Drawing Sheets

PRIOR ART

1300

SERDES ALIGNMENT PROCESS

FIELD OF THE INVENTION

The present disclosure relates to serializer/deserializer systems, and more specifically, to a method for aligning a synchronization First-in First-out ("FIFO") in a SerDes system.

DISCUSSION OF THE RELATED ART

Serializer/deserializer ("SerDes") components are becoming common on integrated System-on-a-chip ("SOC") and Application Specific Integrated Circuits ("ASICs"). The trend has involved increasing the number of serial links at higher and higher speeds in smaller geometry processes. This may be necessary in order to provide the data transmission requirements of higher capacity chips that are severely pin limited. A high speed serial link requires data and clock recovery for wired applications such as backplanes, networks and chip to chip communication. Some industry standards for this type of communication include but are not limited to, Peripheral Component Interconnect Express ("PCIe"), Common Electrical Interface ("CEI-6"), 10 Gigabit Attachment Unit Interface ("XAUI") (IEEE 802.3ae), Serial ATA ("SATA"), Fibrechannel, 802.3ap (e.g., 10GBASE-KR) and others. In this way, transfer data rates from 2.5 Gb/s, up to as high as 20 Gb/s are becoming common.

Some SerDes standards have tight restrictions for lane-to-lane transmit data skew requirements. This often mandates unique reset strategies and/or alignment circuits. For single link, multi-lane configurations, this is a challenging design problem. For multi-link, multi-lane configurations running independently, the problem becomes extremely challenging. This may be further complicated when different links are running at different data rates, or even using different standards.

SUMMARY OF INVENTION

In one embodiment of the present disclosure a method for use with a serializer/deserializer is provided. The method may include operatively connecting one or more lane modules of an integrated circuit (IC) to form one or more links. The method may further include associating a FIFO reset generator with each of the one or more lane modules and receiving a signal from the FIFO reset generator at a synchronization FIFO. The method may also include aligning, at the synchronization FIFO, one or more enqueue pointers and dequeue pointers.

One or more of the following features may be included. The one or more lane modules of the one or more links may not be adjacent. The method may further include designating one of the one or more lane modules as a master lane. The method may also include releasing the one or more enqueue pointers in phase with each other and/or the one or more dequeue pointers in phase with each other. The method may further include detecting, at the synchronization FIFO, a relationship between the one or more enqueue pointers and one or more dequeue pointers and applying an alignment algorithm. The method may also include aligning, at the synchronization FIFO, the one or more enqueue pointers and one or more dequeue pointers without sending an enqueue or dequeue reset signal between the one or more lane modules. The method may further include enabling the synchronization FIFO after the one or more enqueue pointers and one or more dequeue pointers are released from reset. The method may include detecting, at the synchronization FIFO, a collision between at least one enqueue pointer and at least one dequeue pointer. In some embodiments, in response to detecting, the synchronization FIFO may be configured to adjust a position of the at least one enqueue pointer or at least one dequeue pointer. The method may also include monitoring, at each of the one or more lane modules, an incoming change request from a designated master lane.

In another embodiment of the present disclosure an apparatus is provided. The apparatus may include an integrated circuit (IC) including one or more lane modules grouped together to form one or more links. In some embodiments, each of the one or more lane modules may include a FIFO reset generator in communication with a synchronization FIFO configured to align one or more enqueue pointers and dequeue pointers.

One or more of the following features may be included. The one or more lane modules of the one or more links may not be adjacent. The one or more lane modules may include a designated master lane. The FIFO reset generator may be configured to release the one or more enqueue pointers in phase with each other and/or the one or more dequeue pointers in phase with each other. The synchronization FIFO may be configured to detect a relationship between the one or more enqueue pointers and one or more dequeue pointers and to apply an alignment algorithm. The synchronization FIFO may be configured to align the one or more enqueue pointers and one or more dequeue pointers without sending an enqueue or dequeue reset signal between the one or more lane modules. The synchronization FIFO may be enabled after the one or more enqueue pointers and one or more dequeue pointers are released from reset. The synchronization FIFO may be configured to detect a collision between at least one enqueue pointer and at least one dequeue pointer. In some embodiments, in response to the detection, the synchronization FIFO may be configured to adjust a position of the at least one enqueue pointer or at least one dequeue pointer. Each of the one or more lane modules may be configured to monitor incoming change requests from a designated master lane.

Additional features and advantages of embodiments of the present disclosure may be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the present disclosure as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

The present disclosure generally relates to systems and methods for aligning a synchronization FIFO in a multi-lane, multi-link SerDes system. Embodiments of the present disclosure may simplify the procedure for resetting synchronization FIFOs for all of the lanes that comprise a link. Embodiments of the present disclosure may also remove any requirement that the lanes of a particular link need to be adjacent.

The term "adjacent", as used herein and shown in FIGS. 2-15 with reference to lane position, may refer to the position of one or more lanes that are located next to a common module. For example, in FIG. 2, lanes 214A and 214B are considered adjacent to common module 222.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Figure 1:
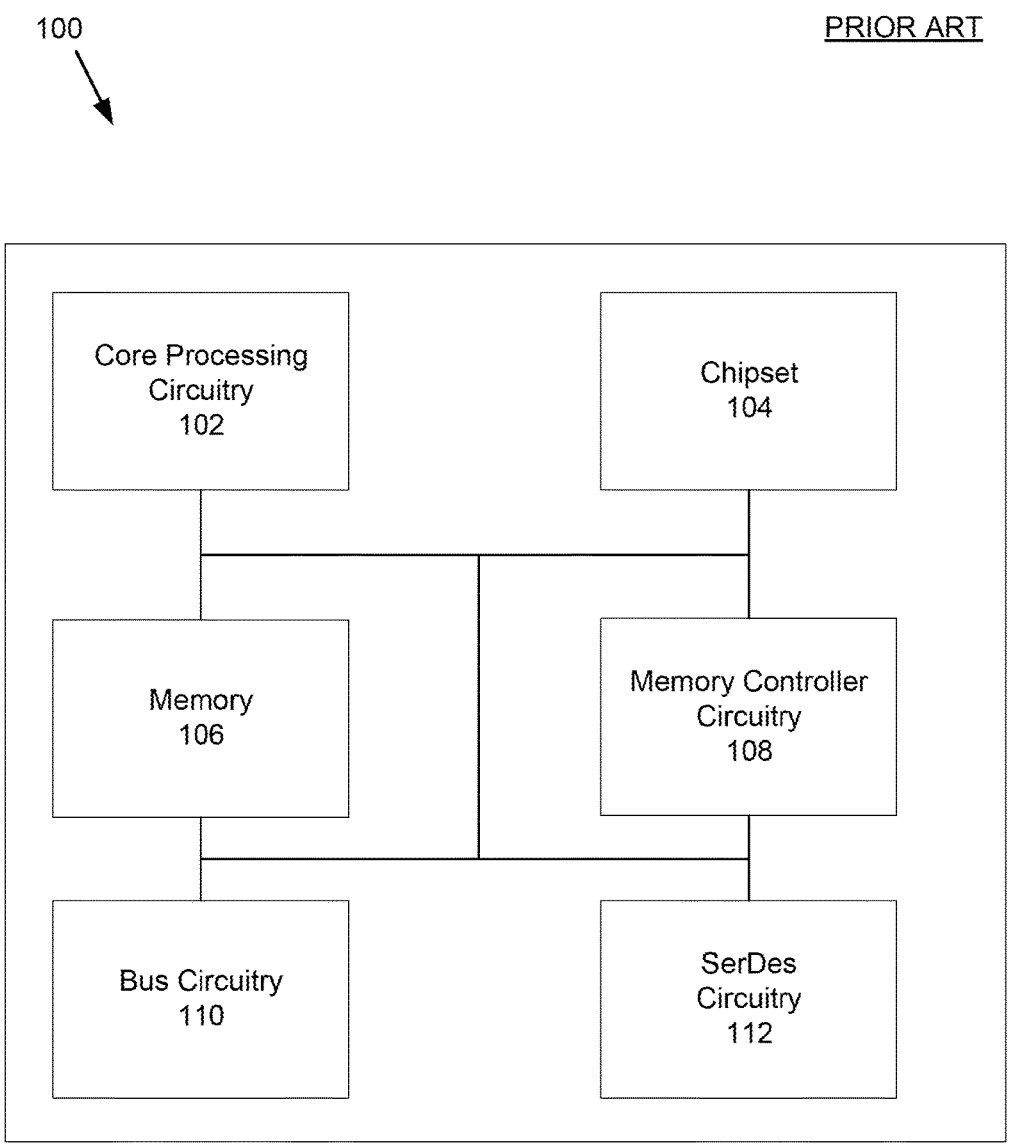
FIG. 1 is a diagram depicting an integrated circuit that may implement an embodiment of a alignment process in accordance with the present disclosure.

Referring now to FIG. 1, an embodiment of an integrated circuit (IC) 100 in accordance with the present disclosure is shown. The term "integrated circuit", as used in any embodiment herein, may refer to a semiconductor device and/or microelectronic device, such as, for example, but not limited to, a semiconductor integrated circuit chip. The specific configuration, arrangement, and components shown in IC 100 are provided merely for exemplary purposes as additional and/or alternative configurations are also within the scope of the present disclosure.

In some embodiments, IC 100 may include core processing circuitry 102, which may include a variety of different processors such as those known in the art. Any suitable processor may be used without departing from the scope of the present disclosure. IC 100 may also include chipset 104. In some embodiments, chipset 104 may include both Northbridge/memory controller hub (MCH) and Southbridge/I/O controller hub (ICH) circuitry. These components may be included within chipset 104 or at any other location within IC 100. IC 100 may also include memory 106, which may be in communication with core processing circuitry 102. Memory 106 may comprise one or more of the following types of memories: semiconductor firmware memory, programmable memory, non-volatile memory, read only memory, electrically programmable memory, random access memory, flash memory (which may include, for example, NAND or NOR type memory structures), magnetic disk memory, and/or optical disk memory. Either additionally or alternatively, memory may comprise other and/or later-developed types of computer-readable memory. In some embodiments, memory 106 may include, for example, 256 KB of two-way level 2 cache. IC 100 may additionally include memory controller circuitry 108 configured to manage the flow of data to and from memory. For example, in some embodiments, memory controller circuitry 108 may include a double-data-rate two synchronous dynamic random access memory (DDR2 SDRAM) controller. IC 100 may further include bus circuitry 110 configured to provide compatibility with a variety of different bus architectures, including, but not limited to, Universal Serial Bus (USB), Serial Advanced Technology Attachment (SATA), Peripheral Component Interface (PCI), PCI-Express and System Management Bus (SMBus).

IC 100 may also include SerDes circuitry 112, which may include numerous components configured to align one or more synchronization FIFOs in a multi-lane, multi-link SerDes system. Some particular examples of the structure and operations of SerDes circuitry 112 are discussed in further detail hereinbelow.

Figure 2:
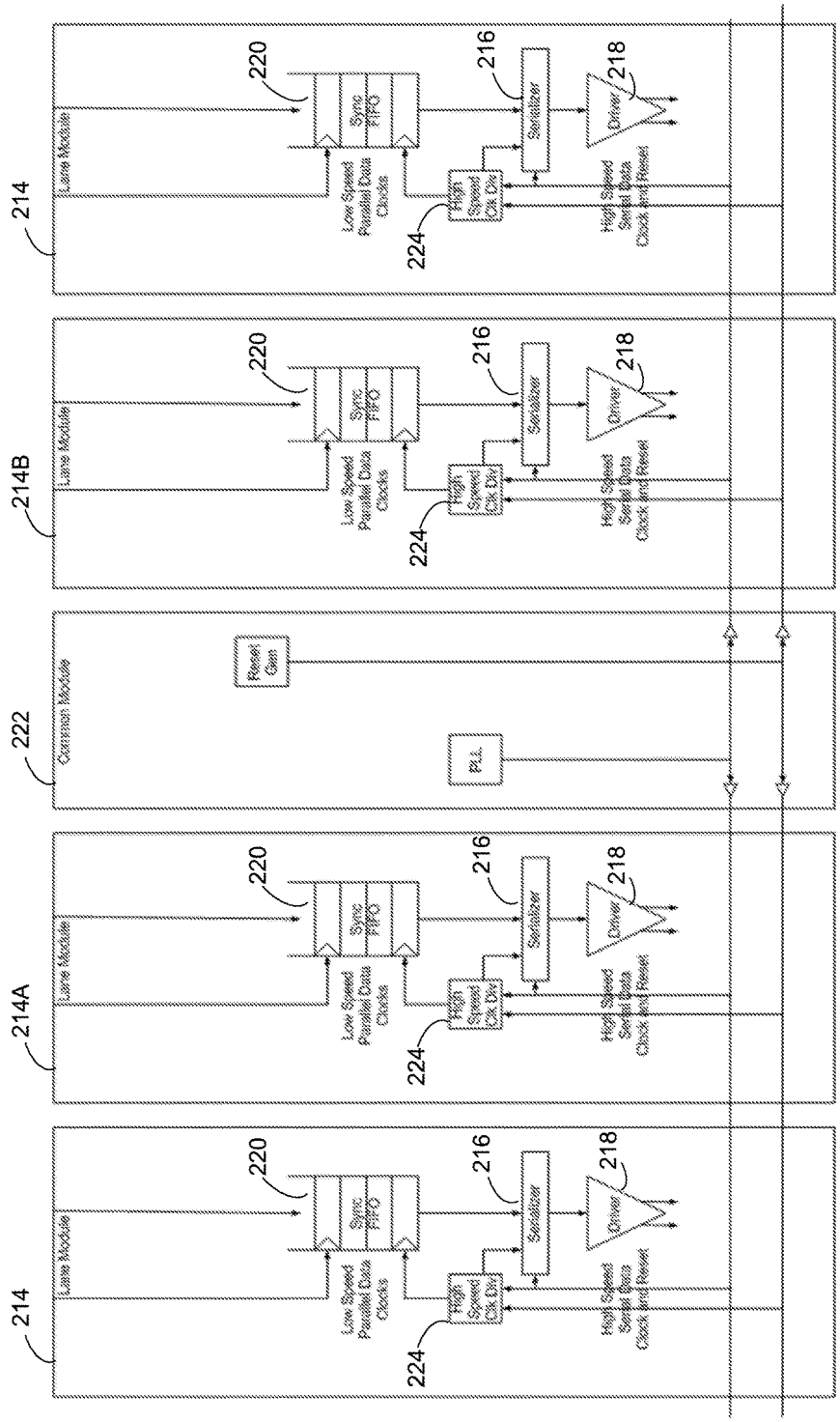
FIG. 2 is a diagram depicting an embodiment of a alignment process in accordance with the present disclosure.

Referring now to FIG. 2, a diagram depicting an example of SerDes circuitry 200 is provided. In this particular example, a single link/multi-lane configuration having one or more lanes 214 operating as a single link and one standard/rate supported at a time is depicted. Accordingly, this example may be configured so that data transmitted from the serializer 216 using the driver 218 may be lined up with minimal specified skew across all lanes in a link. Parallel data entering all sync FIFOs 220 arrives in phase across all lanes, and is timed to the FIFO input clock. This may require that the delta in write data versus read data of the FIFO 220 be the same across all lanes. Any delta adds to the lane-to-lane skew. In some cases, small deltas may be acceptable while full word deltas are generally not acceptable. Write and read clocks for the sync FIFO 220 may have the same frequency, but not necessarily the same phase. Reset of the FIFO 220 and lane-to-lane skew may require FIFO read clocks to be in phase across all lanes 214.

As is shown in FIG. 2, in this particular example the reset of the link may be centrally located (e.g., initiated from the common module 222). The reset may be propagated from the common module 222 to the lanes in the same way the high speed clocks are. The reset may be asynchronous to the high speed clock, which may result in the output low speed parallel data clock from the high speed clock divider 224 being out of phase. This is acceptable margin for lane-to-lane skew, but does make meeting timing in the sync FIFO reset circuits more challenging.

Figure 3:
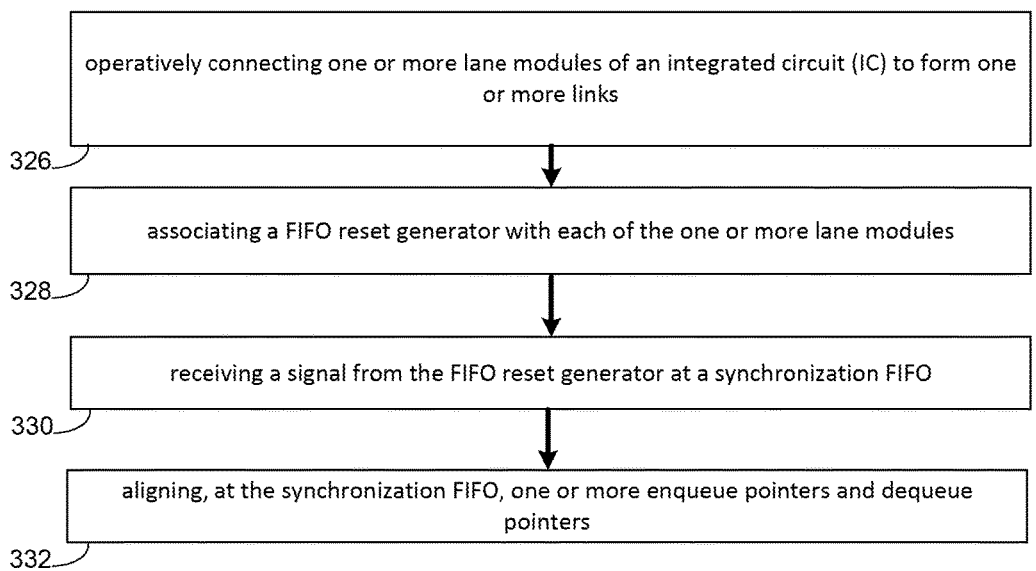
FIG. 3 is a flowchart depicting operations consistent with an embodiment of an alignment process in accordance with the present disclosure.

Referring now to FIG. 3, a flowchart 300 depicting exemplary operations associated with the alignment process of the present disclosure is provided. The process may include operatively connecting (326) one or more lane modules of an integrated circuit (IC) to form one or more links. The process may further include associating (328) a FIFO reset generator with each of the one or more lane modules and receiving (330) a signal from the FIFO reset generator at a synchronization FIFO. The method may also include aligning (332), at the synchronization FIFO, one or more enqueue pointers and dequeue pointers. Embodiments of the alignment process of the present disclosure are described in further detail below.

Figure 4:
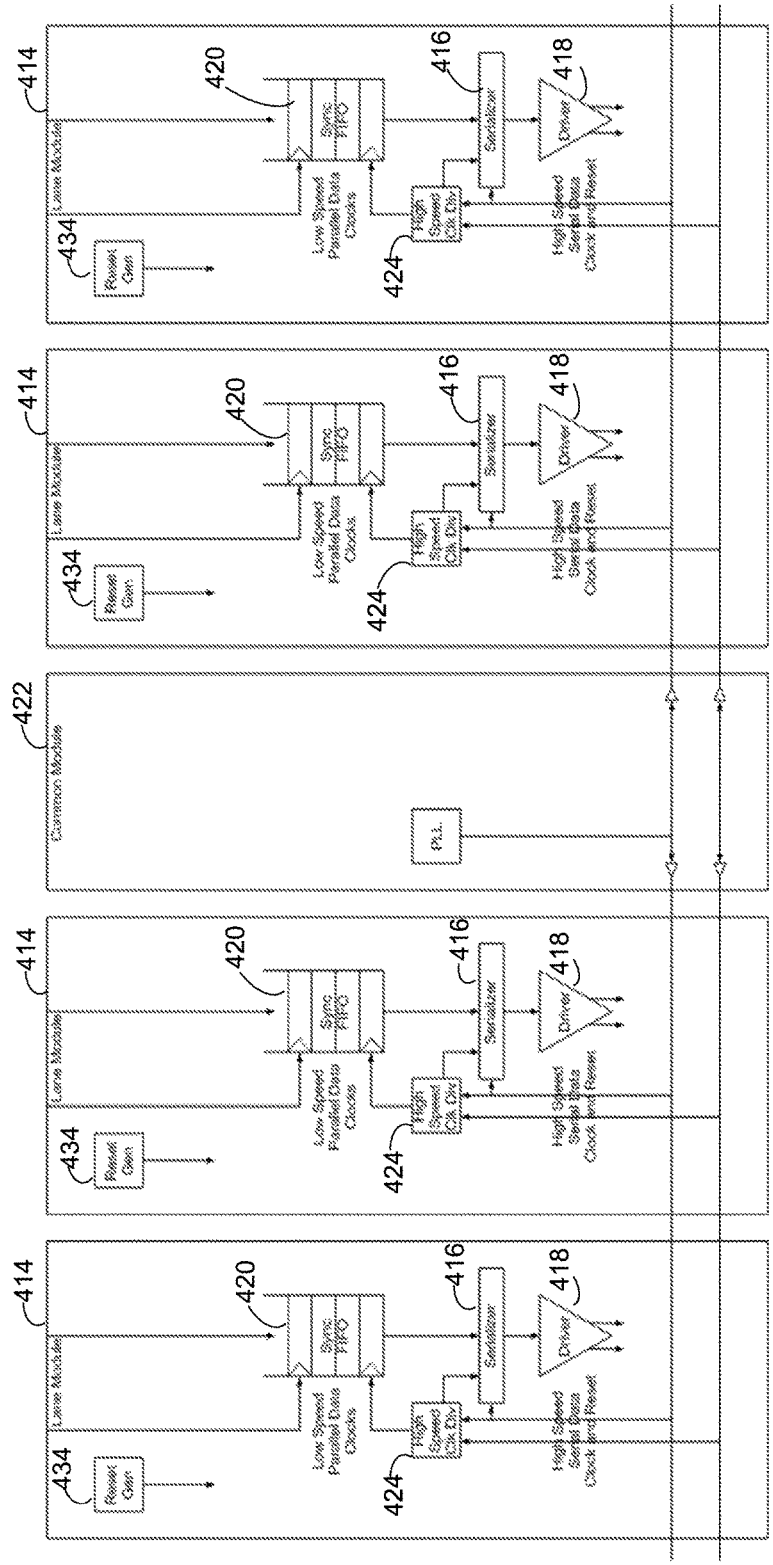
FIG. 4 is a diagram depicting an embodiment of an alignment process in accordance with the present disclosure.

Referring now to FIG. 4, a diagram depicting an example of SerDes circuitry 400 is provided. This particular example differs from that shown in FIG. 2 in that due to the multiple links being implemented, the reset generation is no longer centrally located. Here, each link must be able to be reset independently. Therefore, each lane must have a reset generation circuit 434. Furthermore, multiple lanes 414 may be grouped together to form a link. Therefore, the reset generation circuit 434 from one lane (e.g., master lane) may be required to reset other lanes (e.g., slave lanes) as well. One proposal would be to send each lane reset to the area of the high speed clock circuits, and propagate the reset to all the links. However, most of the time the high speed reset may be propagating the opposite direction relative to the high speed clocks. As a result, it may be more difficult to meet lane to lane skew requirements. Embodiments provided below (e.g. in FIGS. 5-7) provide a mechanism that allow for resets to be associated with a link and reset independently of other links and distinct from the common module 422.

Figure 5:
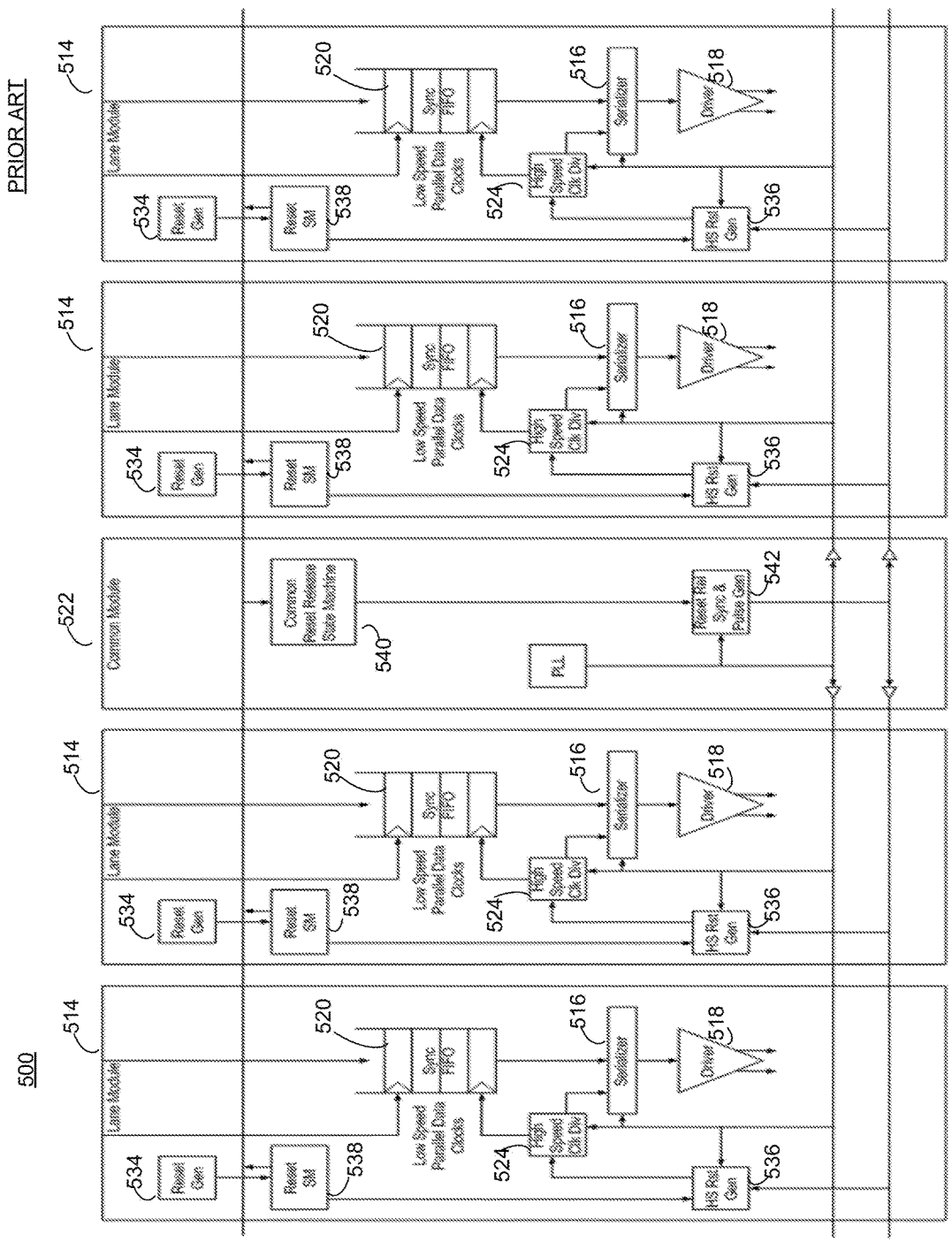
FIG. 5 is a diagram depicting an embodiment of an alignment process in accordance with the present disclosure.

Referring now to FIG. 5, a diagram depicting an example of SerDes circuitry 500 is provided. This particular example shows one possible general case solution illustrated for single data rate. In some embodiments, the high speed reset signal may be replaced by a high speed reset release pulse. SerDes circuitry 500 may further include a high speed reset generator 536 configured to generate the actual reset signal for the clock divider. The reset state machine 538 in the lane 514 may be configured to hold the high speed reset generator 536 in reset and control when it should look for a high speed reset pulse. The common reset release state machine 540 may receive requests to generate a reset pulse from the lane reset state machines 538, arbitrate between requests, and generate a reset pulse request. The reset release synchronize and pulse generator 542 may be configured to synchronize the request and generates a high speed reset release pulse to the lanes 514. In some embodiments, the high speed reset release pulse may be synchronously launched and captured.

Figure 6:
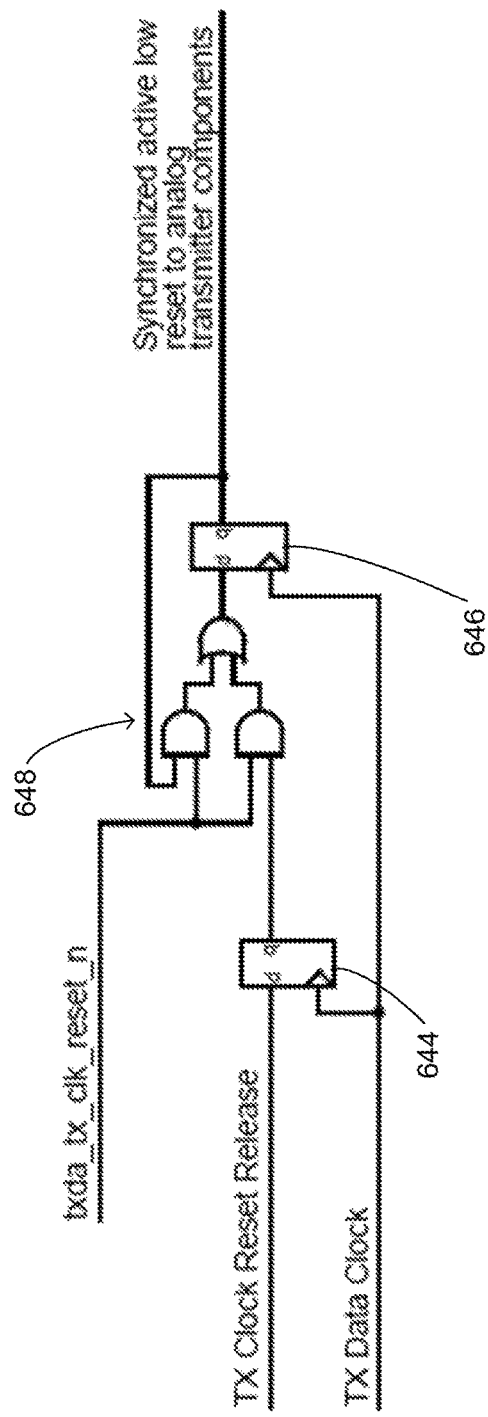
FIG. 6 is a diagram depicting an embodiment of an alignment process in accordance with the present disclosure.

Referring now to FIG. 6, an embodiment of a high speed reset generator 600 is depicted. High speed reset generator 600 may include flip-flops 644 and 646 as well as combinational logic 648. In some embodiments, flip-flop 646 may be configured to generate a synchronous reset to the high speed clock divider 524. Flip-flop 644 may be configured to capture the reset release pulse from the common module synchronously. Combinational logic 648 may be configured to hold the reset active when txda_tx_clk_reset_n is active, and synchronously release the reset when the TX clock reset release pulse is received. It should be noted that the timing of the reset release pulse may be configured such that it arrives long enough after txda_tx_clk_reset_n changes to 1'b1, that there are no metastability issues.

Referring again to FIG. 5, reset release synchronizer and pulse generator 542 may be configured to receive as an input a low speed pulse from the common reset release state machine 540, and synchronize it to the high speed data clock. Reset release synchronizer and pulse generator 542 may utilize the synchronized pulse to detect the rising edge, and generate a pulse on the high speed clock domain. The pulse on the high speed clock domain is what is captured by the high speed reset generator 536 to release the reset in the lane 514. The pulse on the high speed clock domain may be designed to be captured synchronously across all the lanes.

In some embodiments, common reset release state machine 540 may be configured to generate a low speed reset release pulse to the reset release synchronizer and pulse generator 542 at the request of the reset generator 534 in the master lanes. All reset state machines 538 in the master lanes may generate requests for a reset release pulse when their respective link needs to be released from reset. Prior to generating the low speed reset release pulse, the state machine 538 may inform the reset state machines 538 in the lanes 514 that a reset release pulse will be generated. A timing arbitration mechanism may be defined between the lane reset state machines 538 and the common reset release state machine 540, such that the lanes know when a reset release pulse is applicable for a given link. This may be implemented using any suitable approach.

In some embodiments, lane reset state machine 538 may be configured to control the reset process for a given link at the request of the master link's reset generator. When a link is in reset, the reset signal going to the high speed reset generator 536 is held active, such that all link clock dividers are in the reset state. When a link is to be released from reset, this state machine may be configured to send a reset release request to the common reset release state machine 540, and wait for a response indicating that a reset release pulse will be generated. After receiving the response, this state machine may release the reset signal going to the high speed reset generator 536, so the high speed circuits are released from reset when the high speed reset release pulse is captured.

Figure 7:
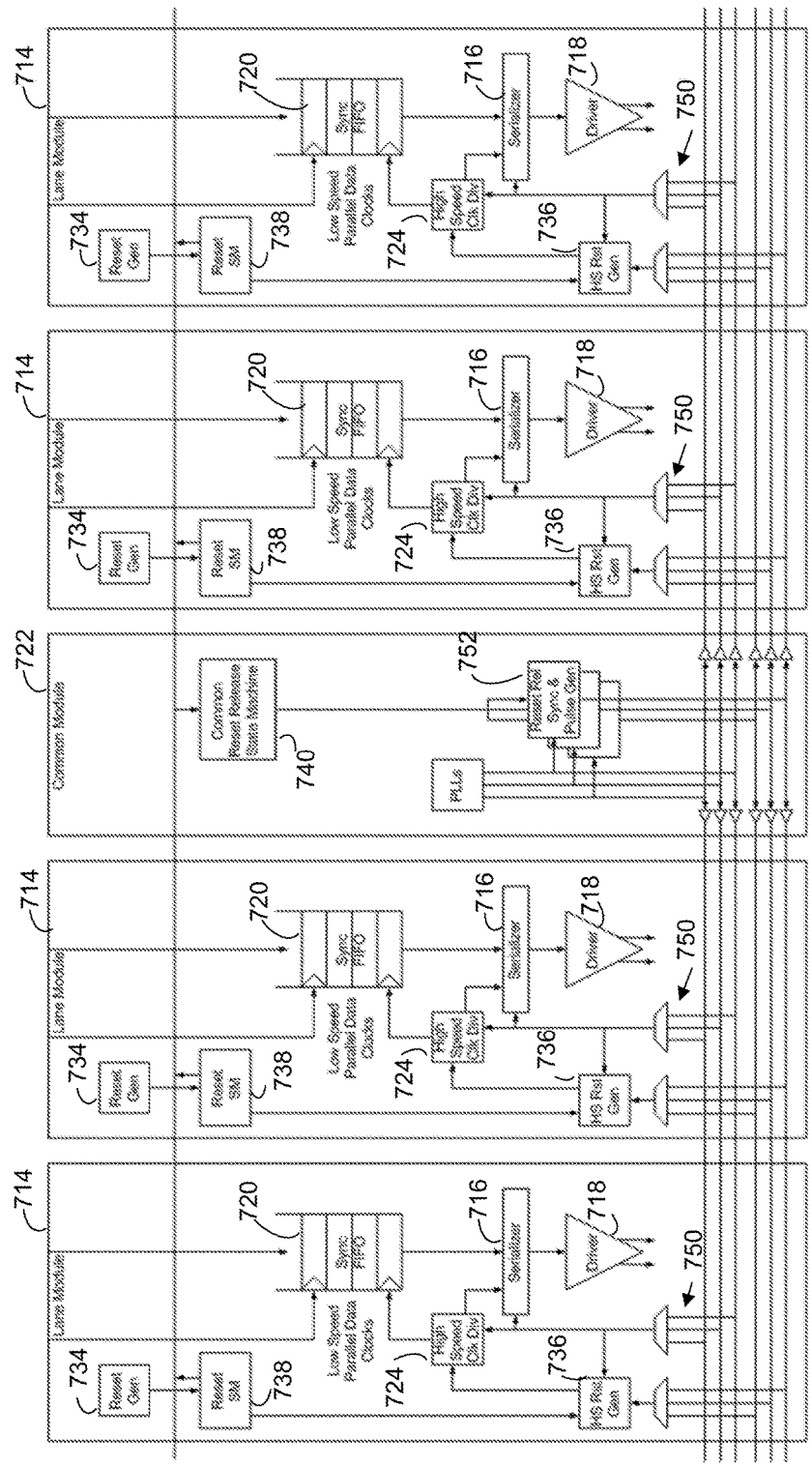
FIG. 7 is a diagram depicting an embodiment of an alignment process in accordance with the present disclosure.

Referring now to FIG. 7, an embodiment depicting an example of a multiple data rate solution is provided. In some embodiments, the multi link/multi lane approach may address the problem of releasing multiple links with multiple lanes from reset in an optimal way that maintains lane to lane skew requirements. There is no logical limit to the number of links that can be supported. In some embodiments, this example may have a better low speed clock skew results across lanes than previous attempts. Because the reset release pulse may be synchronized, the release of the clock divider from reset may be synchronous. Accordingly, low speed clocks for lanes in a given link may have a tighter phase relationship, making meeting timing easier across lanes. Corresponding lane-to-lane skew results have been found to be extremely small.

In some embodiments, the present disclosure may provide parallel support of multiple protocols and data rates and may be expandable to support multiple protocols and data rates simultaneously on different links. For example, some of these may include, but are not limited to, different Peripheral Component Interconnect Express ("PCIe") Generation rates on different links, PCIe Generation rates on some links, and USB 3.0 rates on other links, etc. When multiple link data rates are required, multiple high speed clock signals going to the lanes may be required. For example, for PCIe, three different high speed clock signals may be generated from common, for each of the data rates. In order to support multiple data rates, the reset release synchronizer and pulse generator may be replicated for each high speed clock, resulting in one high speed reset release pulse signal going to the lanes for each high speed clock signal. Additionally and/or alternatively, multiplexers ("MUXes") 750 may be added to the lanes 714 to select the required clock and reset signal for a given data rate. FIG. 7 depicts such a configuration.

In some embodiments, multiple clocks may be utilized and configured to implement a unique reset release synchronizer and pulse generator 752 in common that may be configured to select a clock to generate the reset pulse off of, rather than replicating the generator multiple times for a number of different clock domains. This type of configuration may provide a number of advantages, for example, it may require a fewer number of high speed reset lines.

In some embodiments, if lane-to-lane skew requirements are not as rigid, the common reset release synchronizer and pulse generator 752 may be left out, and the reset release pulse passed asynchronously to the lanes. If there are no lane-to-lane skew requirements, the common components may be left out completely.

In some embodiments, the SerDes circuitry 700 described herein may include one or more variations, some of which may include, but are not limited to, running the reset from the master lane to all other lanes, running individual high speed resets per lane from common to the lanes, running individual high speed resets per link from common to the lanes, running a single reset release pulse to all the lanes, etc.

Embodiments of the present disclosure may provide an efficient design having a small number of relatively simple components. Embodiments may be flexible and scalable and may be used for many lane and link configurations, as well as many data rates for a give implementation.

Referring now to FIGS. 8-15, embodiments consistent with the alignment process of the present disclosure are provided. As discussed above, some SerDes standards have tight restrictions for lane-to-lane transmit data skew requirements. This often mandates unique reset strategies and/or alignment circuits. For single link, multi-lane configurations, this is a challenging design problem. For multi-link, multi-lane configurations running independently, the problem becomes extremely challenging. This may be further complicated when different links are running at different data rates, or even using different standards.

The data synchronization FIFOs are often used to pass data from one clock domain to another. In order to manage lane to lane skew, it is necessary to manage the distance between the enqueue and dequeue pointers in such FIFOs across lanes in a multi-lane link. Embodiments of the alignment process described herein may be configured to provide an optimal solution for this design problem.

Figure 8:
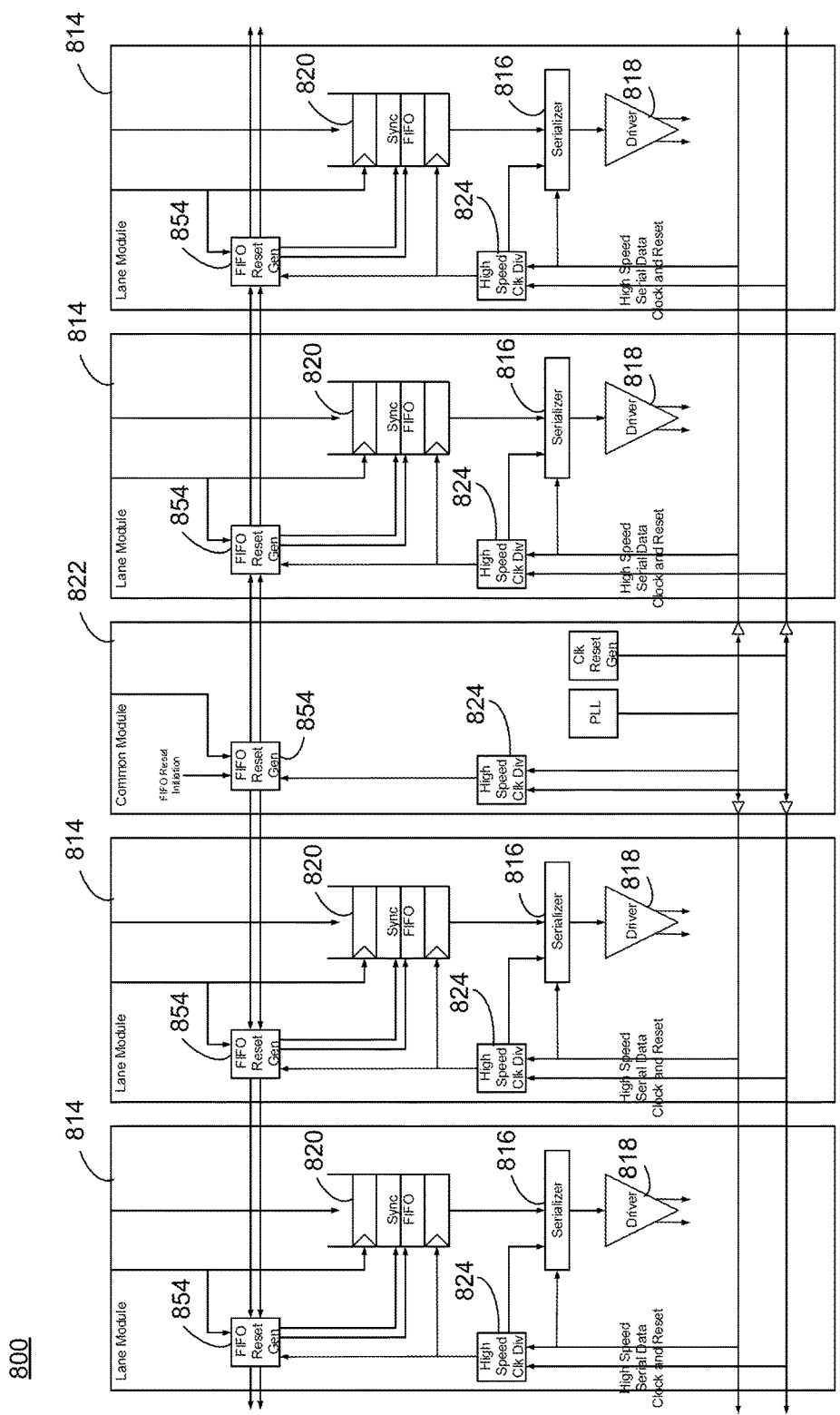
FIG. 8 is a diagram depicting an embodiment of an alignment process in accordance with the present disclosure.

Accordingly, and referring now to FIG. 8, an embodiment depicting a single link/multi lane configuration 800 is provided. In the example of a single link/multi lane configuration, one or more lanes may operate as a single link and one standard and/or rate may be supported at a time. Sync FIFO reset may be initiated in the common module. Two resets may be created in common (e.g., one for enqueue and one for dequeue), and driven to all lanes 814. FIFO enqueue clocks for all lanes may be in phase. Additionally and/or alternatively, FIFO dequeue clocks for all lanes may be in phase. In some embodiments, the FIFO reset generator 854 in common may time the release of the enqueue and dequeue resets relative to the enqueue and dequeue clocks such that they are separated in enough time to prevent pointer collisions. Accordingly, FIFO enqueue and dequeue resets may be passed from one lane to the next synchronous to their respective clocks, in order to maintain the required phase difference.

It should be noted that FIFO enqueue clocks for all lanes may need to be in phase, and the clock may also be required in the common module (or wherever the reset is initiated). This may be a challenge when implementing such a system. Similarly, FIFO dequeue clocks for all lanes may need to be in phase, and a version of the dequeue clock may be necessary in the common module. The FIFO reset generation circuits 854 are complicated to implement and fully verify. Managing the timing relationship of the enqueue and dequeue reset signals going from common to the lanes can be challenging. Embodiments of the alignment process included herein may be configured to address each of these issues.

Figure 9:
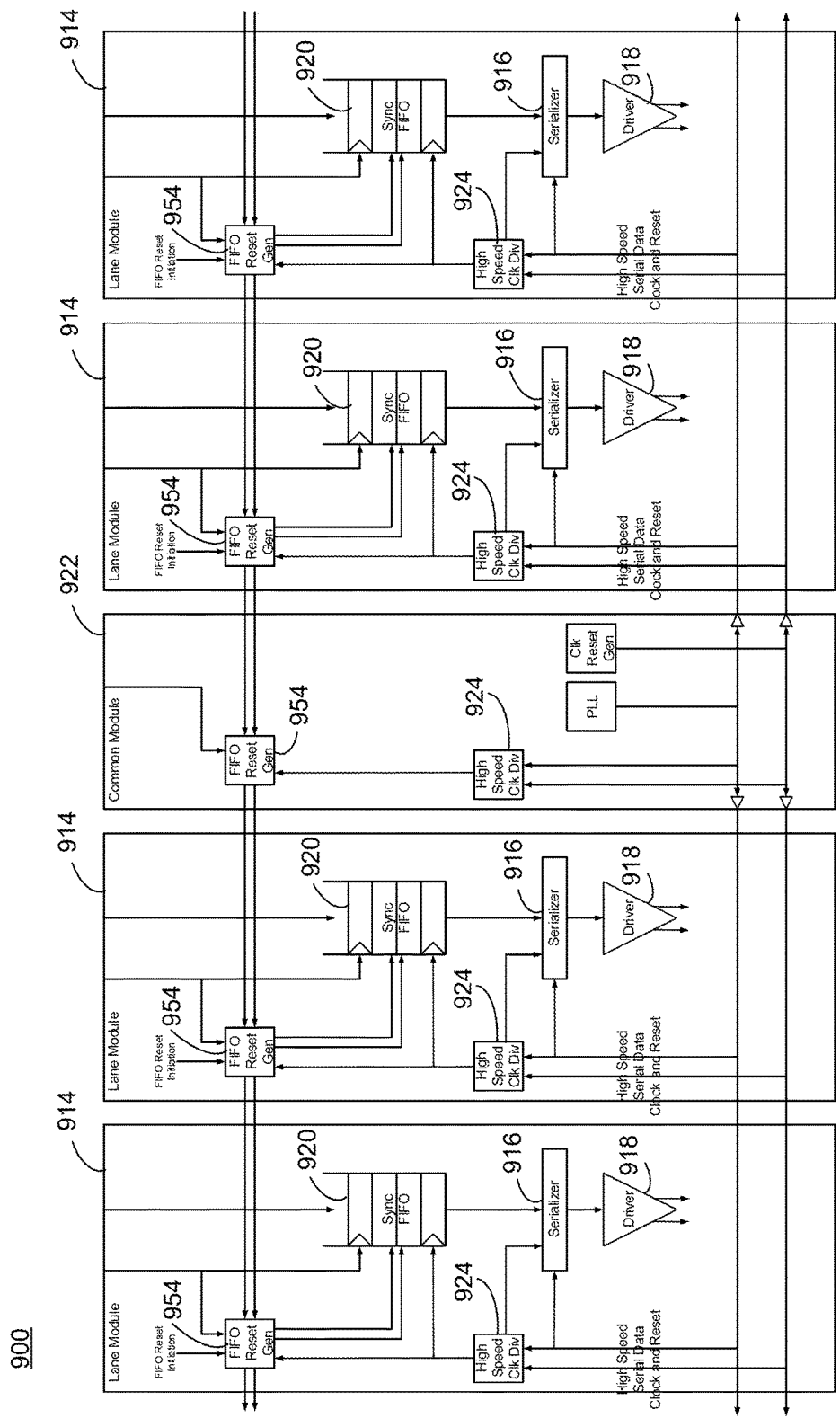
FIG. 9 is a diagram depicting an embodiment of an alignment process in accordance with the present disclosure.

Referring now to FIG. 9, an embodiment depicting a single link/multi lane configuration 900 is provided. In a multi link/multi lane configuration design problems may be further complicated in systems where multiple links may exist with any number of lanes. A reset may be initiated by a master lane in a link and it may propagate to the other lanes that make up a link. Unless a FIFO reset generator 954 is made quite complicated, lanes that make up a link must be placed adjacent to each other (as discussed above lanes on both sides of common may be considered adjacent).

Accordingly, embodiments of the present disclosure may greatly simplify the process of resetting the sync FIFOs 920 for all the lanes 914 that make up a link. Additionally and/or alternatively, the teachings of the present disclosure may eliminate any requirement for lanes 914 that make up a link to be adjacent.

Figure 10:
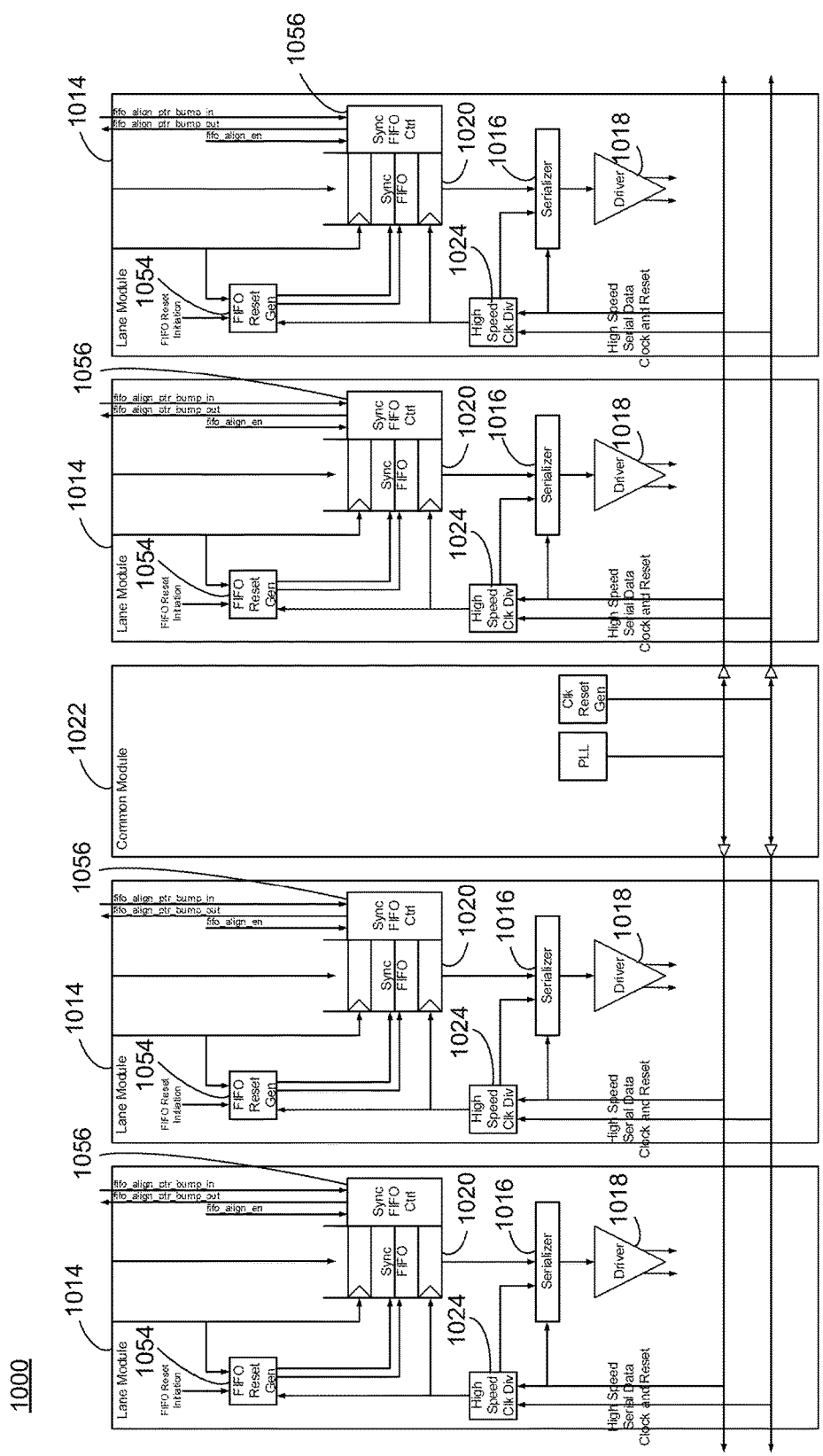
FIG. 10 is a diagram depicting an embodiment of an alignment process in accordance with the present disclosure.

In some embodiments, and referring now to FIG. 10, the alignment process included herein may not require that enqueue and dequeue reset signals are passed between lanes that make up a link. Embodiments of the present disclosure may also include synchronization FIFO control logic as is discussed in further detail hereinbelow.

As discussed above, in some embodiments, the lanes that make up a link are not required to be adjacent. In operation, one lane may be designated as a master lane. The FIFO reset generator 1054 may be configured to release the enqueue pointers in phase with each other and/or the one or more dequeue pointers for all the lanes 1014 in a link in phase with each other. The relationship of the enqueue pointers relative to the dequeue pointers is not a requirement at the time of the reset release. Accordingly, the synchronization FIFO control function may be configured to detect the relationship of the enqueue pointers relative to the dequeue pointers, and separate them in time, using the alignment algorithm discussed herein.

In some embodiments, the FIFO reset generation 1054 may be implemented such that after reset, all enqueue pointers in a link are in phase and all dequeue pointers in a link are in phase. It should be noted that the phase relationship of the enqueue pointers relative to dequeue pointers is not a requirement. This may be implemented using any suitable technique. For example, in some embodiments, when the reset release is initiated, the enqueue and dequeue clocks may be gated off. At a later point in time, the clocks may be started. Additionally and/or alternatively, other options could be implemented where the enqueue and dequeue clocks are enabled, but the initiation of the reset release is synchronized with each clock.

Embodiments of the present disclosure may not require timing between the enqueue and dequeue clocks, other than they be the same clock frequency. The timing requirement that is relieved is between enqueue clocks for the lanes that make up a link, and dequeue clocks for lanes that make up a link. Accordingly, the phase differences that may need to be controlled are across all the enqueue clocks in a link and dequeue clocks that make up a link. It should be noted that there is no phase requirement for the enqueue clock relative to the dequeue clock. However, phase differences in these clocks does impact lane to lane skew, so it still needs to be controlled. For example, if the phase difference between these clocks is too large it may also prevent the ability to change the distance between the enqueue and dequeue pointers enough to prevent pointer collisions.

In some embodiments, synchronization FIFO control 1056 may be enabled after enqueue and dequeue pointers are released from reset, and after enqueue and dequeue clocks are enabled. The synchronization FIFO control 1056 may include a plurality of components, some of which may include, but are not limited to, the circuits discussed in further detail below. For example, a set of circuits that detect when the enqueue and dequeue pointers are colliding, and generates a request to change the distance between the pointers by one position may be included. Additionally and/or alternatively, a circuit that recognizes the request to change the distance between the pointers by one position and actually changes the pointer may also be included.

Figure 11:
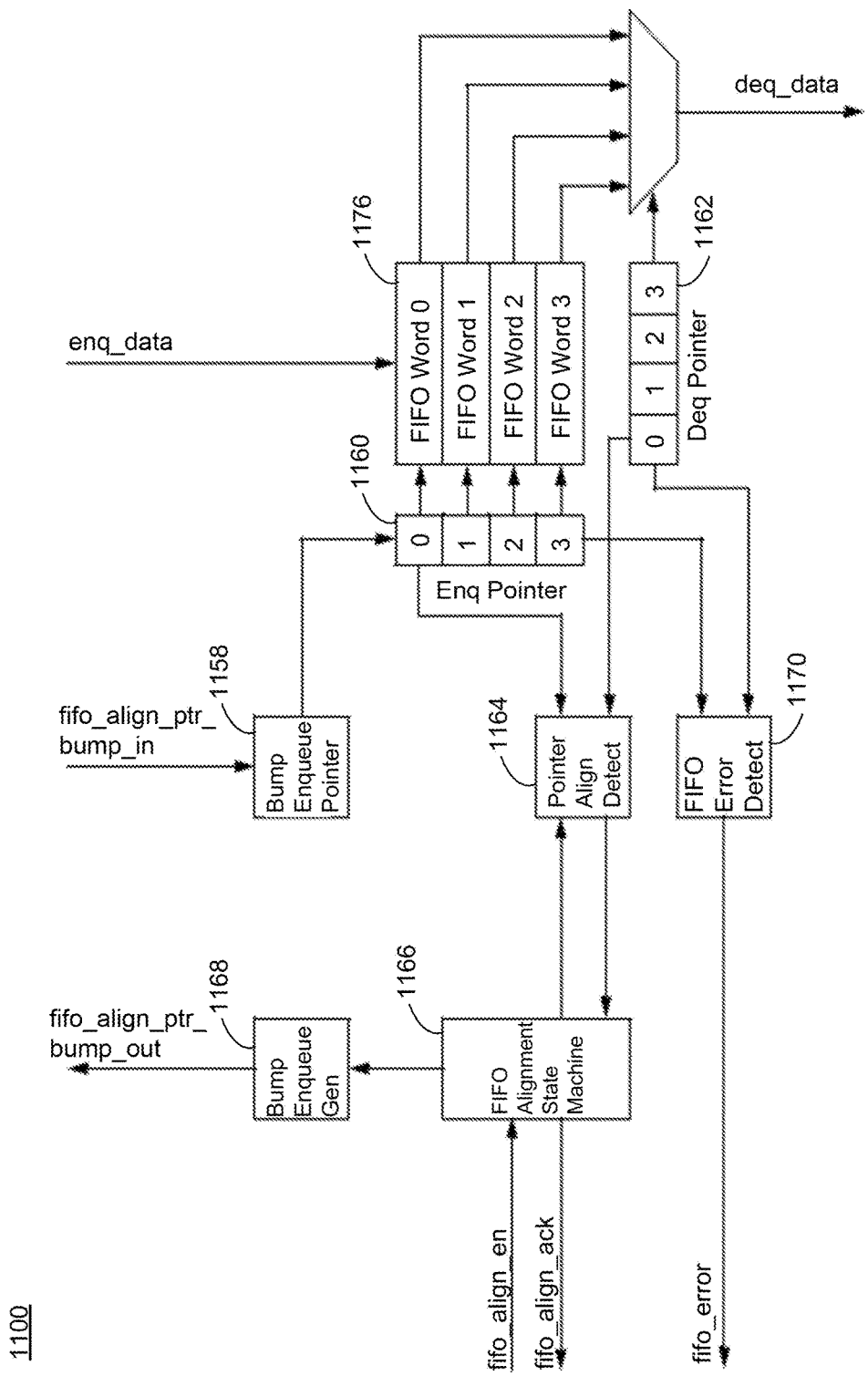
FIG. 11 is a diagram depicting an embodiment of an alignment process in accordance with the present disclosure.

In some embodiments, and referring also to FIGS. 10-11, only one lane of a link (e.g. the designated master lane) may be configured to run the circuit that detects pointer collisions and requests a change. The change request in this particular example is indicated by driving fifo_align_ptr_bump_out active. All lanes of a link may monitor incoming change requests and implement the change. The change request is observed by driving the fifo_align_ptr_bump_in for all lanes in a link with fifo_align_ptr_bump_out from the master lane.

In some embodiments, the bump enqueue pointer 1158 may be configured to change the position of the enqueue 1160 and dequeue pointer 1162 relative to each other when requested to do so by the master lane, via the fifo_align_ptr_bump_in signal. The pointer align detect module 1164 may be configured to detect when there is a collision between the enqueue 1160 and dequeue pointers 1162. The FIFO alignment state machine 1166 may observe the current state of the pointer alignment detect circuit 1164 and generate a series of requests to change the distance between the enqueue 1160 and dequeue pointers 1162, until there is no chance of pointer collisions. Bump enqueue generator 1168 may be configured to generate a request to change the position of the enqueue pointer relative to the dequeue pointer, via the fifo_align_ptr_bump_in signal. FIFO error detect module 1170 may be configured to drive the fifo_error signal active any time a pointer collision is detected, for diagnostic purposes.

In some embodiments, the alignment process may be configured to detect when the enqueue and dequeue pointers are aligned. This may be achieved using any suitable approach. It may be necessary to detect this asynchronously, because the enqueue and dequeue pointers may be clocked by two different clocks that may not be in phase with each other. In some embodiments, a one hot encoding for the enqueue and dequeue pointers may be employed. For example, bit 0 of the pointers may be observed to detect if the pointers are aligned. If bit 0 of both pointers is driven active at the same time, the pointers are considered aligned.

Figure 12:
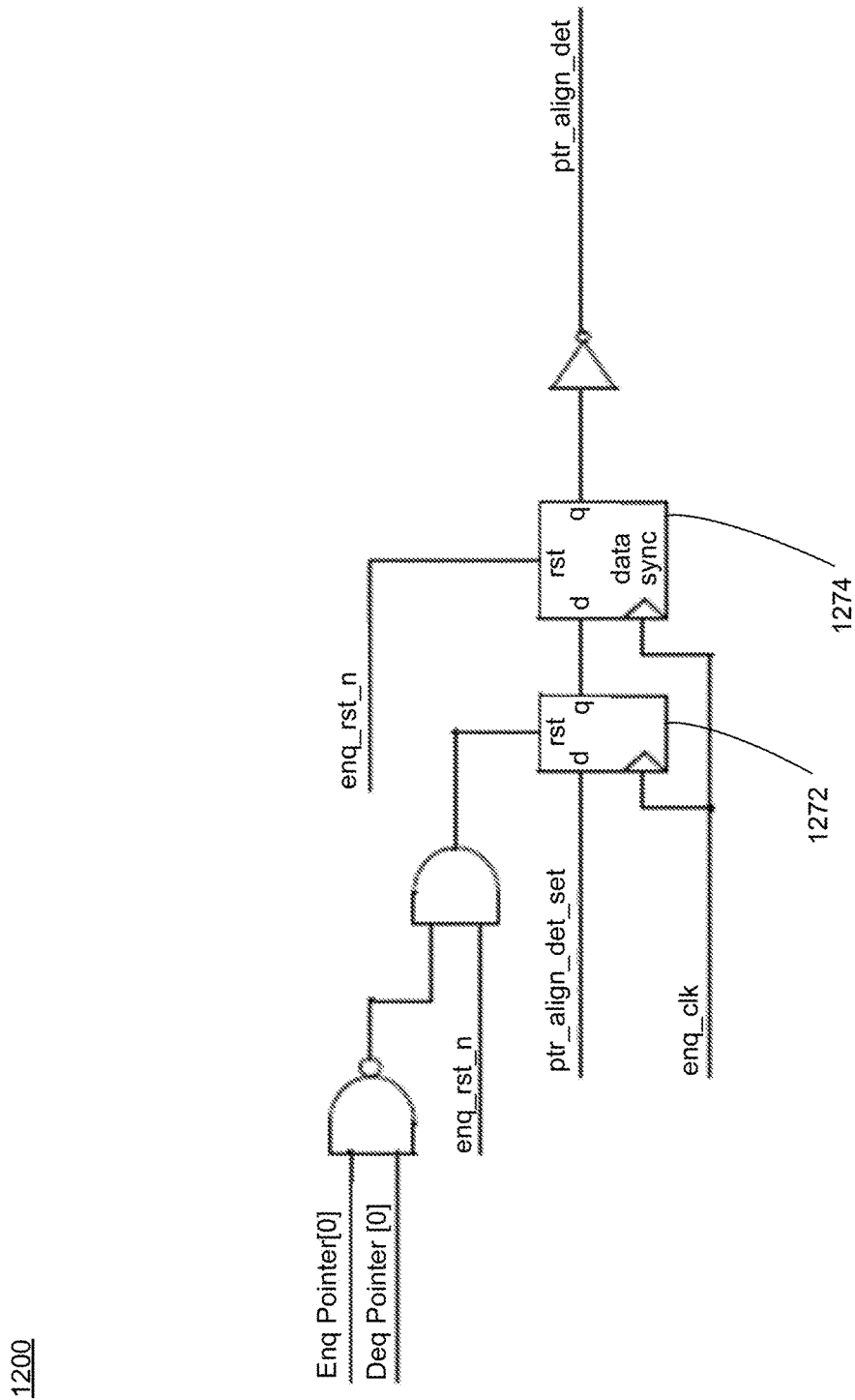
FIG. 12 is a diagram depicting an embodiment of an alignment process in accordance with the present disclosure.

Referring also to FIG. 12, a schematic 1200 depicting one example of pointer alignment detection is provided. In this particular example, the enq_rst_n is the same reset signal that resets the enqueue pointer. Prior to detecting when the pointers are aligned, the ptr_align_det_set signal may be driven active to set the flop 1272 and data sync module 1274. The ptr_align_det_set signal may be driven inactive long enough for the pointers to step through all states. If the pointers are aligned, the flop 1272 will be cleared, and the value propagated through the data sync module 1274 to the ptr_align_det signal.

Figure 13:
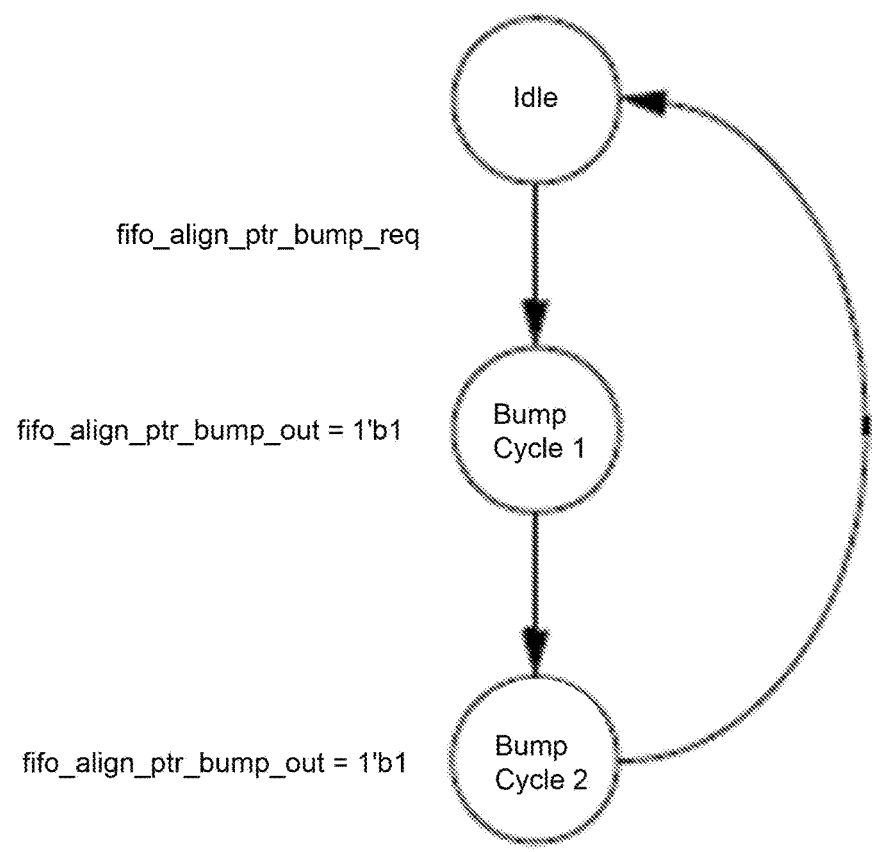
FIG. 13 is a diagram depicting an embodiment of an alignment process in accordance with the present disclosure.

Referring also to FIG. 13, an example of a state machine 1300 showing an implementation of a bump enqueue generator is provided. The fifo_align_ptr_bump_out signal may be implemented as an asynchronous signal, to avoid having to meet timing as the signal may be propagated to all lanes in a link. This circuit may create a two cycle long pulse on this signal, when a change in the pointer positions is requested by the FIFO alignment state machine 1166.

Figure 14:
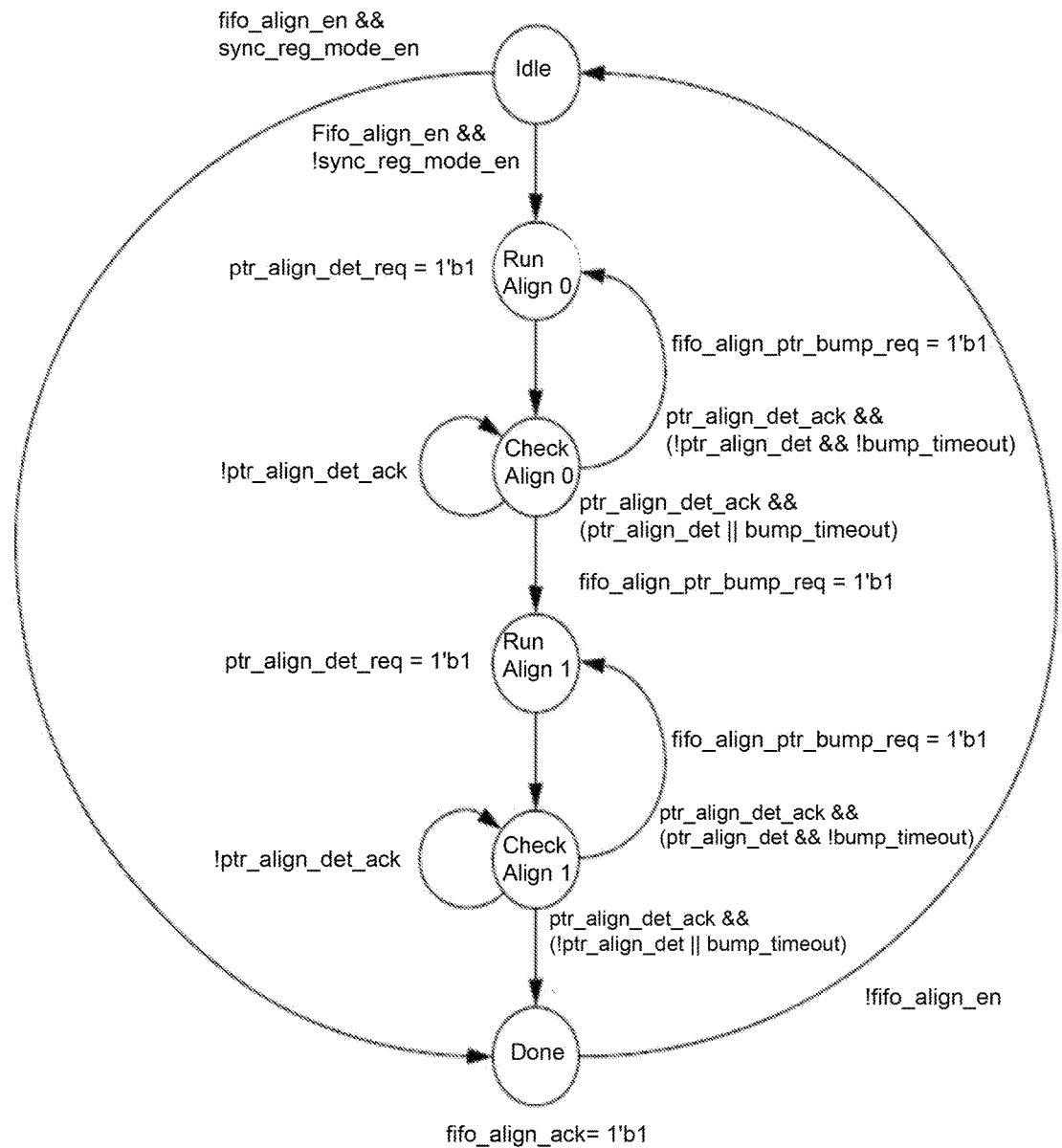
FIG. 14 is a diagram depicting an embodiment of an alignment process in accordance with the present disclosure.

Referring also to FIG. 14, an example state diagram 1400 is provided. In some embodiments, the FIFO alignment state machine 1166 included herein may be configured to observe the current state of the enqueue and dequeue pointers in the master lane and to initiate requests to all the lanes in the link to change the distance between the enqueue and dequeue pointers. The general procedure for the state machine may include requesting changes to the distance between the pointers until the pointers have been detected as being aligned. The procedure may further include requesting changes to the distance between the pointers until the pointers have been detected as no longer being aligned. An example state description of the FIFO alignment state machine 1166 is provided in Table 1 below.

TABLE 1

| State | Description |
|---|---|
| Idle | In this state, the FIFO alignment process had not started, and the state machine is waiting for the fifo_align_en signal to be driven active. It should be noted that if the FIFO is in sync register mode, the alignment process is skipped. |
| Run Align 0 | In this state, the procedure for checking the current alignment state of the enqueue and dequeue pointers is being initiated. |
| Check Align 0 | In this state, the state machine is waiting for the completion of the procedure for checking the alignment state of the enqueue and dequeue pointers. Once a completion is detected, one of three options are selected for the next state If the bump time-out counter has reached 0, the state machine is a slave state machine that has reached a corner case where the FIFO alignment process is actually complete, and this state machine is still running. In this scenario, the state machine advances to the Run Align 1 state, and activates a request to drive the fifo_align_ptr_bump_out to 1'b1. When ptr_align_det is driven to 1'b0, the pointers are currently not colliding. In this scenario, the state machine advances to the Run Align 0 state, and activates a request to drive the fifo_align_ptr_bump_out to 1'b1. When ptr_align_det is driven to 1'b1, the pointers are currently colliding. In this scenario, the state machine advances to the Run Align 1 state, and activates a request to drive the fifo_align_ptr_bump_out to 1'b1. |
| Run Align 1 | In this state, the procedure for checking the current alignment state of the enqueue and dequeue pointers is being initiated. |
| Check Align 1 | In this state, the state machine is waiting for the completion of the procedure for checking the alignment state of the enqueue and dequeue pointers. Once a completion is detected, one of two options are selected for the next state. If the bump time-out counter has reached 0, the state machine is a slave state machine that has reached a corner case where the FIFO alignment process is actually complete, and this state |

TABLE 1-continued

| State | Description |
| --- | --- |
| | machine is still running. In this scenario, the state machine advances to the Done state. |
| | When ptr_align_det is driven to 1'b1, the pointers are still currently colliding. In this scenario, the state machine advances to the Run Align 1 state, and activates a request to drive the fifo_align_ptr_bump_out to 1'b1. |
| | When ptr_align_det is driven to 1'b0, the pointers are currently no longer colliding. In this scenario, the state machine advances to the Done state. |
| Done | In this state, the FIFO alignment process has completed, and the state machine is waiting for the fifo_align_en signal to be driven inactive. When in this state, the fifo_align_ack signal is driven active. |

Figure 15:
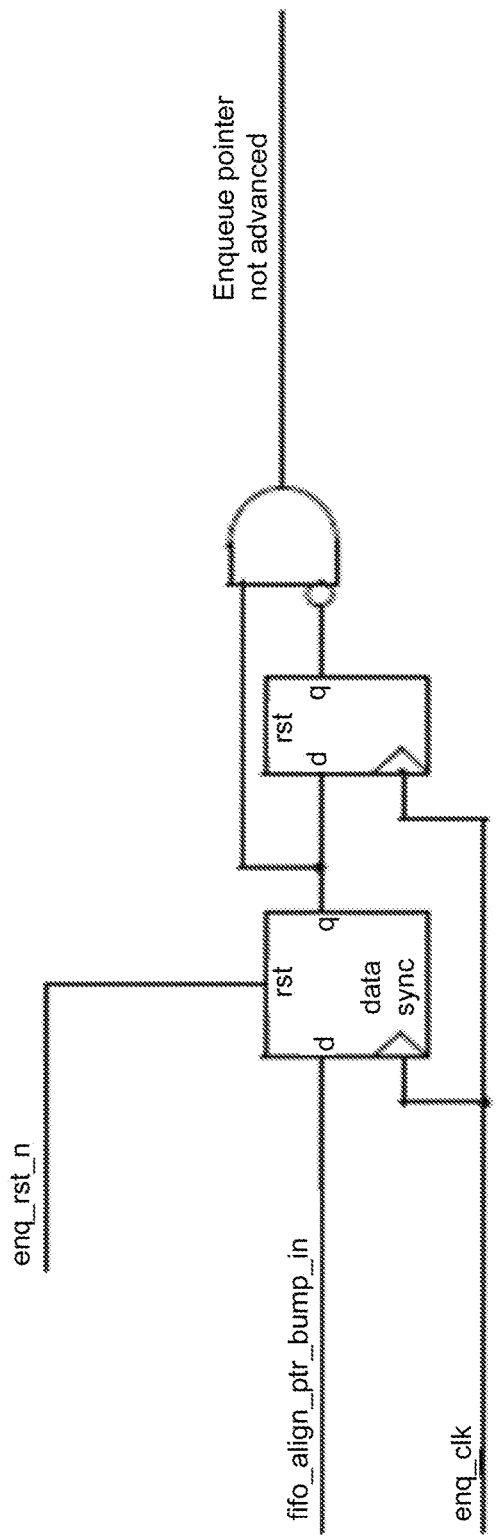
FIG. 15 is a diagram depicting an embodiment of an alignment process in accordance with the present disclosure.

Referring now to FIG. 15, a schematic 1500 depicting an example of a bump enqueue pointer is provided. Schematic 1500 includes an example of a circuit including an edge detector on the fifo_align_ptr_bump_in signal. In some embodiments, the bump enqueue pointer may be configured to change the position of the enqueue and dequeue pointer relative to each other when requested to do so by the master lane, via the fifo_align_ptr_bump_in signal. This may be implemented by avoiding any advancement of the enqueue pointer for one clock cycle, however, numerous other implementations are also within the scope of the present disclosure. Some of these may include, but are not limited to, avoiding any advancement of the dequeue pointer, advancing either pointer by 2 in a given clock cycle, etc. It should be noted that more margin exists between the enqueue and dequeue pointers at the completion of the algorithm if the enqueue pointer is not advanced for one clock cycle.

In some embodiments, the fifo_align_ptr_bump_in signal may also be controlled by a diagnostic register. Driving the register active and inactive may be used to change the position of the pointers relative to each other, and the collision points may be observed by the fifo_error signal. Though some of the examples included herein have been discussed in the context of a four-word deep FIFO 1176, it should be noted that the teachings of the present disclosure are not intended to be limited to such an arrangement.

Embodiments of the alignment process described herein may provide numerous advantages over existing technologies. Some of these include, but are not limited to, reduced complexity, less demand on meeting timing on high speed resets that may propagate across an entire macro, significant reduction in the complexity required for multi-lane links to be adjacent to each other, etc.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A method for use with a serializer/deserializer comprising:
operatively connecting at least two lane modules of an integrated circuit (IC) to form one or more links;
associating a FIFO reset generator with each of the at least two lane modules;
receiving a signal from the FIFO reset generator at a synchronization FIFO;
aligning, at the synchronization FIFO, one or more enqueue pointers and dequeue pointers; and
detecting, at the synchronization FIFO, a relationship between the one or more enqueue pointers and one or more dequeue pointers and applying an alignment algorithm.

2. The method of claim 1, wherein the at least two lane modules of the one or more links are not adjacent.

3. The method of claim 1, further comprising:
designating one of the at least two lane modules as a master lane.

4. The method of claim 1, further comprising:
releasing, via the FIFO reset generator, the one or more enqueue pointers in phase with each other or the one or more dequeue pointers in phase with each other.

5. The method of claim 1, further comprising:
aligning, at the synchronization FIFO, the one or more enqueue pointers and one or more dequeue pointers without sending an enqueue or dequeue reset signal between the at least two lane modules.

6. The method of claim 1, further comprising:
enabling the synchronization FIFO after the one or more enqueue pointers and one or more dequeue pointers are released from reset.

7. The method of claim 6, further comprising:
detecting, at the synchronization FIFO, a collision between at least one enqueue pointer and at least one dequeue pointer.

8. The method of claim 7, wherein, in response to detecting, the synchronization FIFO is configured to adjust a position of the at least one enqueue pointer or at least one dequeue pointer.

9. The method of claim 8, further comprising:
monitoring, at each of the at least two lane modules, an incoming change request from a designated master lane.

10. An apparatus for use with a serializer/deserializer, comprising:
an integrated circuit (IC) including at least two lane modules grouped together to form one or more links, wherein each of the at least two lane modules includes a FIFO reset generator in communication with a synchronization FIFO configured to align one or more enqueue pointers and dequeue pointers, wherein the synchronization FIFO is enabled after the one or more enqueue pointers and one or more dequeue pointers are released from reset.

11. The apparatus of claim 10, wherein the at least two lane modules of the one or more links are not adjacent.

12. The apparatus of claim 10, wherein the at least two lane modules includes a designated master lane.

13. The apparatus of claim 12, wherein the synchronization FIFO is configured to detect a collision between at least one enqueue pointer and at least one dequeue pointer.

14. The apparatus of claim 13, wherein, in response to the detection, the synchronization FIFO is configured to adjust a position of the at least one enqueue pointer or at least one dequeue pointer.

15. The apparatus of claim 14, wherein each of the at least two lane modules is configured to monitor incoming change requests from a designated master lane.

16. The apparatus of claim 10, wherein the FIFO reset generator is configured to release the one or more enqueue pointers in phase with each other or the one or more dequeue pointers in phase with each other.

17. The apparatus of claim 10, wherein synchronization FIFO is configured to detect a relationship between the one or more enqueue pointers and one or more dequeue pointers and to apply an alignment algorithm.

18. The apparatus of claim 10, wherein the synchronization FIFO is configured to align the one or more enqueue pointers and one or more dequeue pointers without sending an enqueue or dequeue reset signal between the at least two lane modules.

* * * * *